United States Patent
Alwusaibie et al.

(10) Patent No.: US 11,754,734 B2
(45) Date of Patent: Sep. 12, 2023

(54) PLACING WELLS IN A HYDROCARBON FIELD BASED ON SEISMIC ATTRIBUTES AND QUALITY INDICATORS

(71) Applicant: Saudi Arabian Oil Company, Dhahran (SA)

(72) Inventors: Abdullah Alwusaibie, Dammam (SA); Ali Almahozi, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 252 days.

(21) Appl. No.: 16/901,833

(22) Filed: Jun. 15, 2020

(65) Prior Publication Data
US 2021/0389488 A1    Dec. 16, 2021

(51) Int. Cl.
*G01V 1/30* (2006.01)
*E21B 49/00* (2006.01)
(Continued)

(52) U.S. Cl.
CPC .............. *G01V 1/306* (2013.01); *E21B 49/00* (2013.01); *E21B 49/087* (2013.01); *G01V 1/104* (2013.01);
(Continued)

(58) Field of Classification Search
CPC ........ G01V 1/306; G01V 1/104; G01V 1/181; G01V 1/345; E21B 49/00; E21B 49/087
See application file for complete search history.

(56) References Cited

U.S. PATENT DOCUMENTS 10,162,071 B1  12/2018  Morton et al.
11,327,191 B2 *  5/2022  Sodagar ................. G01V 1/301
(Continued)

FOREIGN PATENT DOCUMENTS

WO    WO-2016007808 A1 *  1/2016  .............. G01V 1/28
WO    2017222540           12/2017
(Continued)

OTHER PUBLICATIONS

Sodaga, Stratigraphic Trapped Carbonate Reservoirs Gas Detection using Mono Frequency Spectral Decomposition Ratio Approach, Application in Saudi Arabia, Feb. 1, 2018, AAPG/Middle East GTW, Datapages/Search and Discovery Article #90318m Abstract (Year: 2018) (Abstract only).*

(Continued)

*Primary Examiner* — Mischita L Henson
(74) *Attorney, Agent, or Firm* — Fish & Richardson P.C.

(57) ABSTRACT

Systems and methods of placing wells in a hydrocarbon field based on seismic attributes and quality indicators associated with a subterranean formation of the hydrocarbon field can include receiving seismic attributes representing the subterranean formation and seismic data quality indicators. A cutoff is generated for each seismic attribute and seismic data quality indicator. A weight is assigned to each seismic attribute and seismic data quality indicator. The weighted seismic attributes and data quality indicators are aggregated for each location in the hydrocarbon field. A risk ranking is assigned based on the weighted seismic attributes and data quality indicators associated with each location in the hydrocarbon field based on the cutoffs. A map is generated with each location on the surface of the subterranean formation color-coded based on its assigned risk ranking.

11 Claims, 7 Drawing Sheets
(1 of 7 Drawing Sheet(s) Filed in Color)

(51) Int. Cl.
    *E21B 49/08*     (2006.01)
    *G01V 1/104*     (2006.01)
    *G01V 1/18*     (2006.01)
    *G01V 1/34*     (2006.01)

(52) U.S. Cl.
    CPC .............. *G01V 1/181* (2013.01); *G01V 1/345* (2013.01); *G01V 2210/1212* (2013.01); *G01V 2210/144* (2013.01); *G01V 2210/6226* (2013.01); *G01V 2210/642* (2013.01)

(56) References Cited

U.S. PATENT DOCUMENTS

| | | | |
|---|---|---|---|
| 2003/0074138 A1 | 4/2003 | Dablain et al. | |
| 2005/0125157 A1* | 6/2005 | Toelle | G01V 1/306 702/14 |
| 2018/0334902 A1 | 11/2018 | Olsen et al. | |
| 2021/0350052 A1* | 11/2021 | AlQahtani | E21B 43/20 |

FOREIGN PATENT DOCUMENTS

| | | |
|---|---|---|
| WO | 2018136448 | 8/2018 |
| WO | 2018217686 | 11/2018 |
| WO | 2019211773 | 11/2019 |

OTHER PUBLICATIONS

Alwusaibie, "Revealing the stratigraphic potential of a clastic reservoir using reservoir-to-shadow monofrequency (RSMF) and amplitude analysis in Saudi Arabia." SEG Technical Program Expanded Abstracts 2017. Society of Exploration Geophysicists, Aug. 2017, 3391-3395, 5 pages.

Guizada et al., "Application of underbalanced coiled tubing drilling technology to enhance gas production in deep carbonate reservoirs." Abu Dhabi International Petroleum Exhibition & Conference. OnePetro, Nov. 2018, 8 pages.

Wikipedia.org [online], "Seismic Attibute" May 2018 [retrieved on Sep. 13, 2021], retrieved from: URL <https://en.wikipedia.org/w/index.php?title=Seismic_attribute&oldid=840521991>, 4 pages.

PCT International Search Report and Written Opinion in International Appln. No. PCT/US2021/036586, dated Sep. 23, 2021, 16 pages.

Abdullah et al., "A Play-Based Evaluation of a Deepwater Sabah Exploration Area: Prospect Maturation and Implications for Remaining Prospectivity," Presented at the Offshore Technology Conference Asia, Kuala Lumpur, Malaysia, Mar. 20-23, 2018; Offshore Technology Conference, 2018, 17 pages.

Gading et al., "Methods for Seismic Sweet Spot Identification, Characterization and Prediction in Shale Plays," Presented at the Unconventional Resources Technology Conference, Aug. 12-14, 2013; URTeC, 2013, 5 pages.

Liu et al., "Combined petrophysics and 3Dseismic attributes to predict shale reservoirs favourable areas," Journal of Geophysics and Engineering, 2019, 16:974-991.

Singavarapu et al., "Integrated seismic attribute analysis to characterize Tertiary Rus/Radhuma reservoirs: An emerging exploration play in Kuwait," SEG Technical Program Expanded Abstracts, Society of Exploration Geophysicists, 2018, pp. 1768-1772.

Strecker et al., "Seismic attenuation and hybrid attributes to reduce exploration risk—North Sea case study," SEG Technical Program Expanded Abstracts, Society of Exploration Geophysicists, 2005, pp. 436-439.

Wang et al., "Application of 3D seismic attributes to optimize the placement of horizontal wells within a tight gas sand reservoir, Ordos Basin, China," Geophysics, May-Jun. 2016, 81(3):B77-B86.

Zhang et al., "Correlation of Seismic Attributes to Well Production," SEG Denver 2014 Annual Meeting, 2014, 6 pages.

Zhao et al., "Geological characteristics and key exploration technologies of continental shale oil sweet spots: A case study of Member 2 of Kongdian Formation in the Cangdong sag in the Huanghua depression, Bohai Bay Basin," Petroleum Research, 2019, 4:97-112.

* cited by examiner

PLACING WELLS IN A HYDROCARBON FIELD BASED ON SEISMIC ATTRIBUTES AND QUALITY INDICATORS

TECHNICAL FIELD

The present disclosure generally relates to hydrocarbon exploration, more particularly to approaches to placing wells in subterranean formation of a hydrocarbon field.

BACKGROUND

Hydrocarbon exploration is the search by geologists and geophysicists for deposits of hydrocarbons, particularly petroleum and natural gas. Visible surface features such as oil seeps and natural gas seeps sometimes provide evidence of hydrocarbon generation. However, most exploration depends on highly sophisticated technology to detect and determine the extent of these deposits using exploration geophysics. Gravity surveys, magnetic surveys, and seismic surveys can be used to detect large-scale features of subterranean formations. Leads generated by these surveys are typically subjected to more detailed seismic survey. When a prospect has been identified that meets selection criteria, an exploration well is drilled in an attempt to determine the presence or absence of oil or gas.

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications, for example, identification of potential petroleum reservoirs. Seismic surveys are conducted by using a controlled seismic source (for example, a seismic vibrator or dynamite) to create seismic waves. The seismic source is typically located at ground surface. Seismic body waves travel into the ground, are reflected by subsurface formations, and return to the surface where they recorded by sensors called geophones. Seismic surface waves travel along the ground surface and diminish as they get further from the surface. Seismic surface waves travel more slowly than seismic body waves. The geologists and geophysicists analyze the time it takes for the seismic body waves to reflect off subsurface formations and return to the surface to map sedimentary facies and other geologic features. Similarly, analysis of the time it takes seismic surface waves to travel from source to sensor can provide information about near surface features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This specification describes systems and methods that reduce the risks and expenses associated drilling wells during the exploration and development of hydrocarbon fields. These systems and methods integrate different seismic attributes and seismic data quality indicators to identify sweet spots (i.e., locations for well placements that are likely to result in successful wells). This approach is flexible and can be adjusted different numbers of seismic attributes and data quality indicators that are preferably independent of each other. For example, these systems and methods are most effective when each of the incorporated seismic attributes and data quality indicators are associated with a different characteristic of the hydrocarbon field such as having one associated with reservoir properties, another associated with fluid properties, and a third associated with seismic data quality. This approach can incorporate distinct cutoff parameters for each individual input being integrated.

These systems and methods can provide a ranking of the relative desirability of different locations in a hydrocarbon field for possible well placement. For example, a prototype implementing this approach represents ranked geobodies in the subterranean formation of a hydrocarbon as a color-coded surface map.

In one aspect, methods of placing wells in a hydrocarbon field based on seismic attributes and quality indicators associated with a subterranean formation of the hydrocarbon field include: receiving seismic attributes representing the subterranean formation; receiving seismic data quality indicators; generating cutoffs for each seismic attribute and seismic data quality indicator; assigning a weight to each seismic attribute and seismic data quality indicator; aggregating the weighted seismic attributes and data quality indicators for each location in the hydrocarbon field; assigning a risk ranking based on the weighted seismic attributes and data quality indicators associated with each location in the hydrocarbon field based on the cutoffs; and generating a map with each location on the surface of the subterranean formation color-coded based on its assigned risk ranking.

In one aspect, methods of presenting a visual representation of sweet spots in in a hydrocarbon field based on seismic attributes and quality indicators associated with a subterranean formation of the hydrocarbon field include: receiving seismic attributes representing the subterranean formation; receiving seismic data quality indicators; generating cutoffs for each seismic attribute and seismic data quality indicator by performing a feasibility analysis establishing a relationship between an input and a property of the subterranean formation; assigning a weight to each seismic attribute and seismic data quality indicator; aggregating the weighted seismic attributes and data quality indicators for each location in the hydrocarbon field; assigning a risk ranking based on the weighted seismic attributes and data quality indicators associated with each location in the hydrocarbon field based on the cutoffs; and generating a map with each location on the surface of the subterranean formation color-coded based on its assigned risk ranking.

In one aspect, systems for placing wells in a hydrocarbon field based on seismic attributes and quality indicators associated with a subterranean formation of the hydrocarbon field include: an attribute selection module receiving seismic attributes representing the subterranean formation and seismic data quality indicators; a cutoff analysis module generating cutoffs for each seismic attribute and seismic data quality indicator; a weighting and aggregation module assigning a weight to each seismic attribute and seismic data quality indicator, aggregating the weighted seismic attributes and data quality indicators for each location in the hydrocarbon field, and assigning a risk ranking based on the weighted seismic attributes and data quality indicators associated with each location in the hydrocarbon field based on the cutoffs; and a mapping module generating a map with each location on the surface of the subterranean formation color-coded based on its assigned risk ranking.

Embodiments of the systems and methods can include one or more of the following features.

In some embodiments, systems and methods also include generating seismic data representing the subterranean formation. In some cases, systems and methods also include drilling at least one location whose risk ranking is in a lowest category of risk rankings.

In some embodiments, generating cutoffs comprises performing a feasibility analysis establishing a relationship between an input and a property of the subterranean formation.

In some embodiments, receiving seismic attributes comprises receiving at least one seismic attribute providing an indication of hydrocarbon presence and at least one seismic attribute providing an indication of reservoir quality. In some cases, receiving seismic attributes comprises receiving at least two seismic attributes providing an indication of hydrocarbon presence that represent different elements of reservoir characteristics or data quality. In some cases, receiving seismic attributes comprises receiving mono frequency spectral decomposition (Mono FSD) and reservoir to shadow mono frequency (RMSF) attributes. In some cases, receiving seismic attributes comprises receiving sweetness and acoustic impedance attributes. In some cases, receiving seismic data quality indicators comprises receiving seismic noise percentage, data confidence, or both.

In some embodiments, a cutoff analysis module generates cutoffs by performing a feasibility analysis establishing a relationship between an input and a property of the subterranean formation.

In some embodiments, receiving seismic attributes comprises receiving at least one seismic attribute providing an indication of hydrocarbon presence and at least one seismic attribute providing an indication of reservoir quality. In some cases, receiving seismic attributes comprises receiving at least two seismic attributes providing an indication of hydrocarbon presence that represent different elements of reservoir characteristics or data quality. In some cases, receiving seismic attributes comprises receiving mono frequency spectral decomposition (Mono FSD) and reservoir to shadow mono frequency (RMSF) attributes. In some cases, receiving seismic attributes comprises receiving sweetness and acoustic impedance attributes.

The system and methods described in this specification provides a systematic approach to reducing the risks of proposed hydrocarbon wells associated with geological heterogeneity and seismic data quality. This approach facilitates the integrated evaluation of proposed wells by a number of different seismic attributes and can present the combined results in a single map. In contrast to seismic attribute analysis done by computing different attributes where each attribute is associated with a certain reservoir property, this approach avoids assessing attribute maps in individual display panels or superimposing one attribute on the other. By integrating as many seismic attributes as desired in addition to incorporating seismic data quality indicators, this approach provides an easy-to-use tool for comprehensive reservoir properties evaluation by combines all inputs for efficient evaluation and risk analysis of proposed well placements.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

This specification describes systems and methods that reduce the risks and expenses associated drilling wells during the exploration and development of hydrocarbon fields. These systems and methods integrate different seismic attributes and seismic data quality indicators to identify sweet spots (i.e., locations for well placements that are likely to result in successful wells) that have low levels of the risks associated with geological heterogeneity and seismic data quality. This approach is flexible and can be adjusted different numbers of seismic attributes and data quality indicators that are preferably independent of each other. For example, these systems and methods are most effective when each of the incorporated seismic attributes and data quality indicators are associated with a different characteristic of the hydrocarbon field such as having one associated with reservoir properties, another associated with fluid properties, and a third associated with seismic data quality. This approach can incorporate distinct cutoff parameters for each individual input being integrated.

Figure 1:
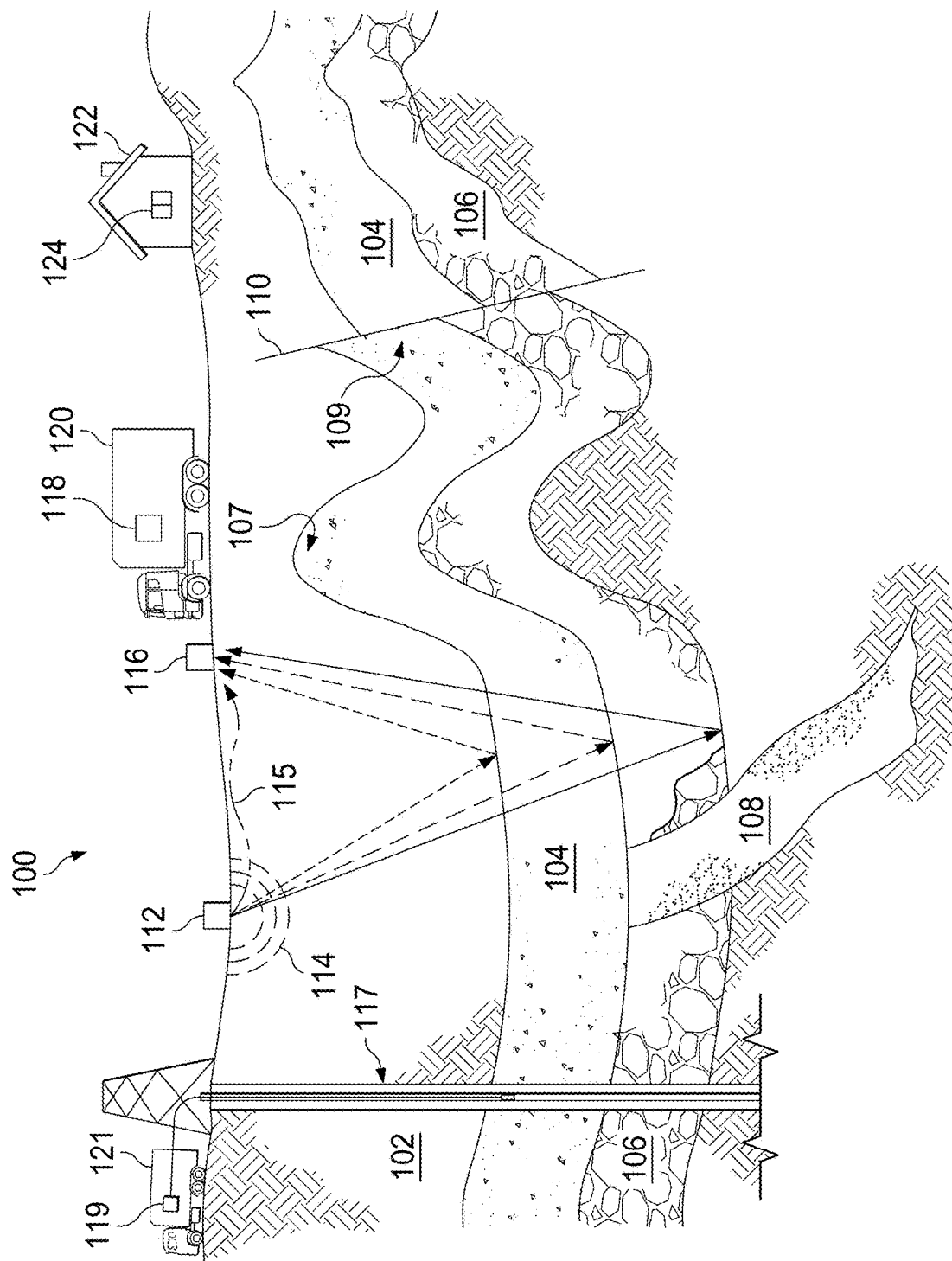
FIG. 1 is a schematic view of a seismic survey being performed to map subterranean features such as facies and faults.

FIG. 1 is a schematic of a subterranean formation 100 being evaluated as possible hydrocarbon field. A seismic survey is being performed to map subterranean features such as facies and faults in the subterranean formation 100. The results of the seismic survey provide the basis for determining the placement of an exploration well 117 drilled in an attempt to determine the presence or absence of oil or gas in a specific portion of the subterranean formation 100.

The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface.

The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120.

The control center can also receive, store, process, and analyze data from other data acquisition and wellsite systems that provide additional information about the subterranean formation. For example, a well 117 is illustrated as drilled into the subterranean formation based on information generated by the seismic survey. The control center 122 can receive data from a computer 119 associated with a well logging unit 121 being used to generate location-specific information to confirm, correct, and supplement the information generated by the seismic survey about the subterranean formation 100. In addition, drilling the well 117 can verify whether hydrocarbons are present at that location.

The computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Figure 2:
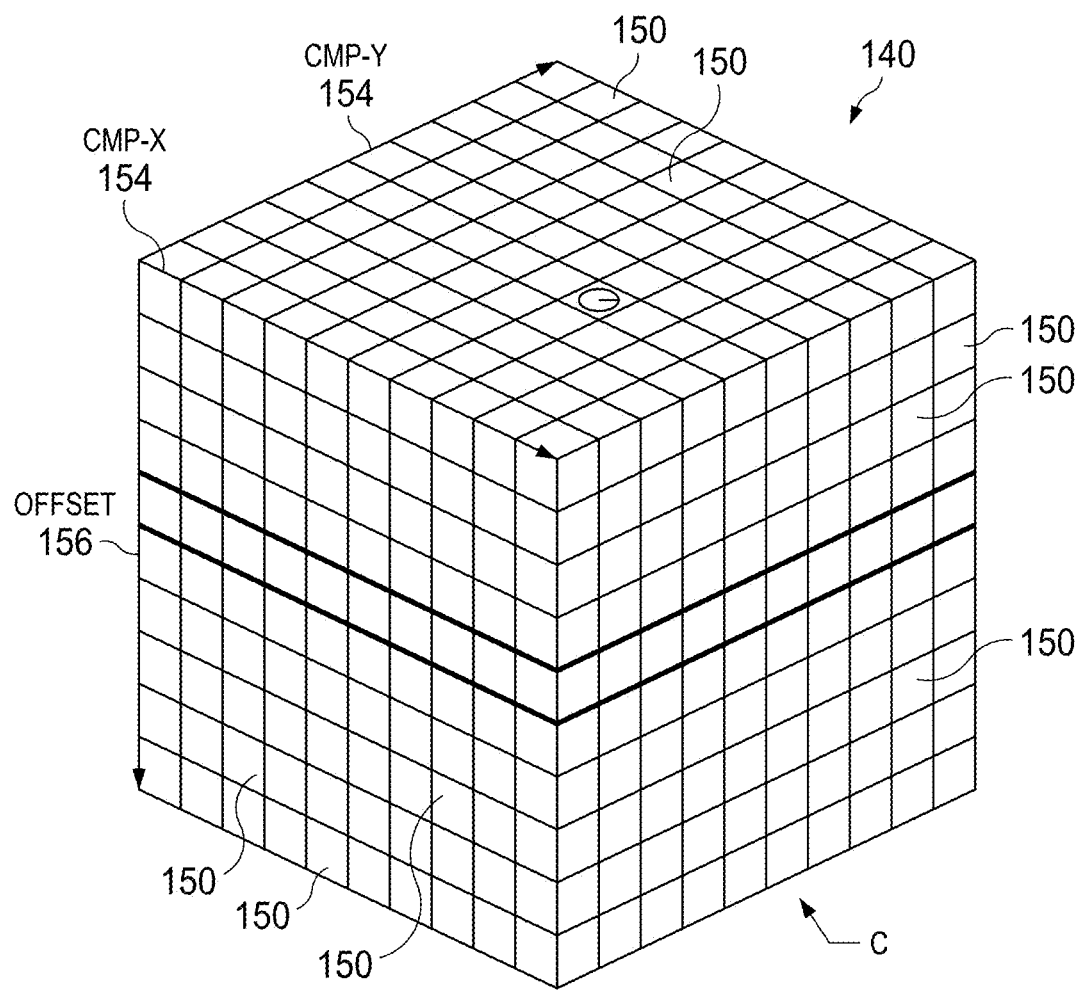
FIG. 2 illustrates a three-dimensional representation of the subterranean region where the seismic survey was performed.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and an offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
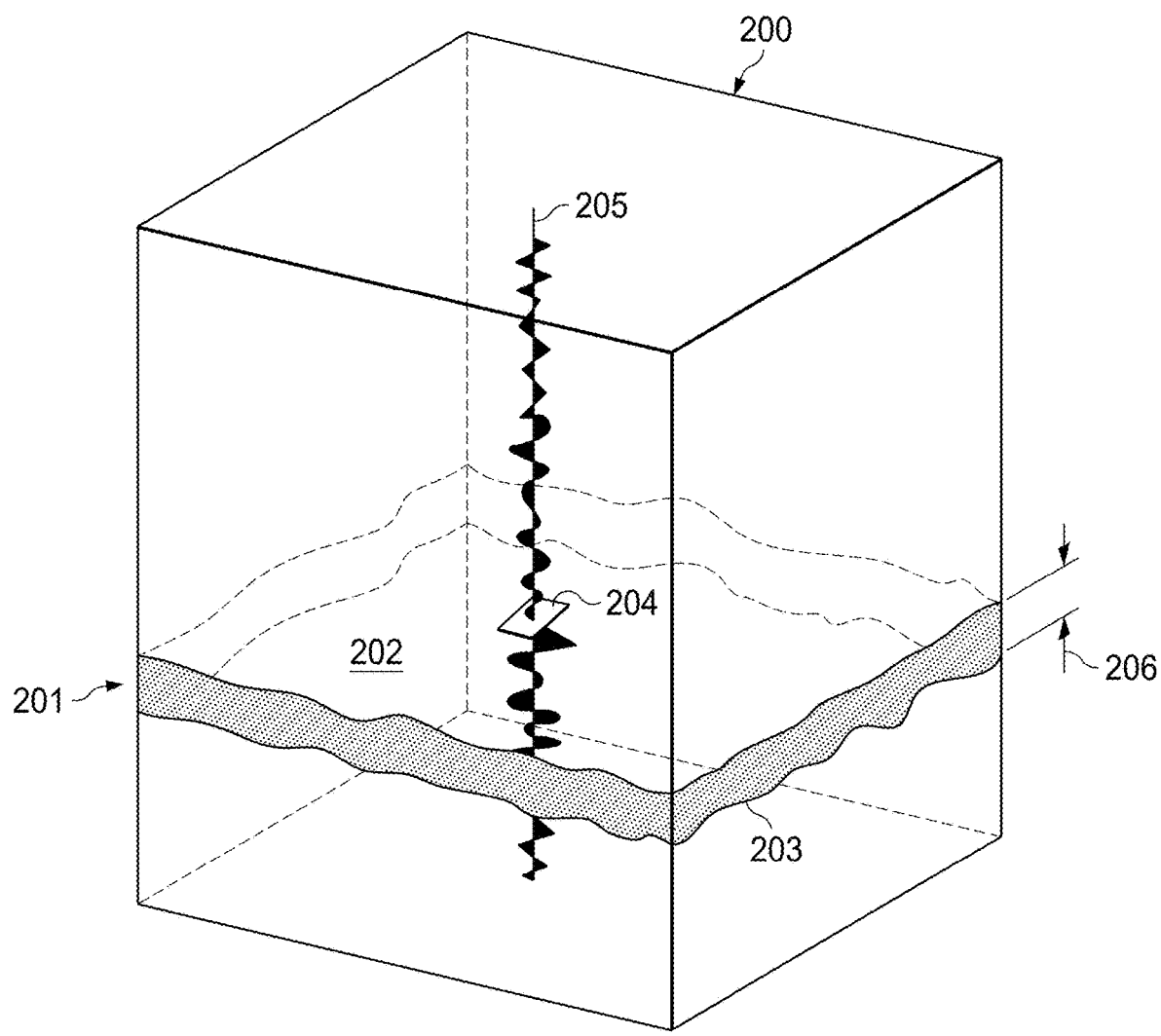
FIG. 3 illustrates a stratigraphic trace within a formation.

FIG. 3 illustrates a seismic cube 200 representing a formation. The seismic cube has a stratum 201 based on a surface (for example, an amplitude surface 202) and a stratigraphic horizon 203. The amplitude surface 202 and the stratigraphic horizon 203 are grids that include many cells such as exemplary cell 204. Each cell is a sample of a seismic trace representing an acoustic wave. Each seismic trace has an x-coordinate and a y-coordinate, and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window. This approach can be used to generate a three-dimensional amplitude attribute for the formation. This approach can also be used to generate other three-dimensional seismic attributes, such as, Mono FSD, RSMF, and Sweetness.

Figure 4:
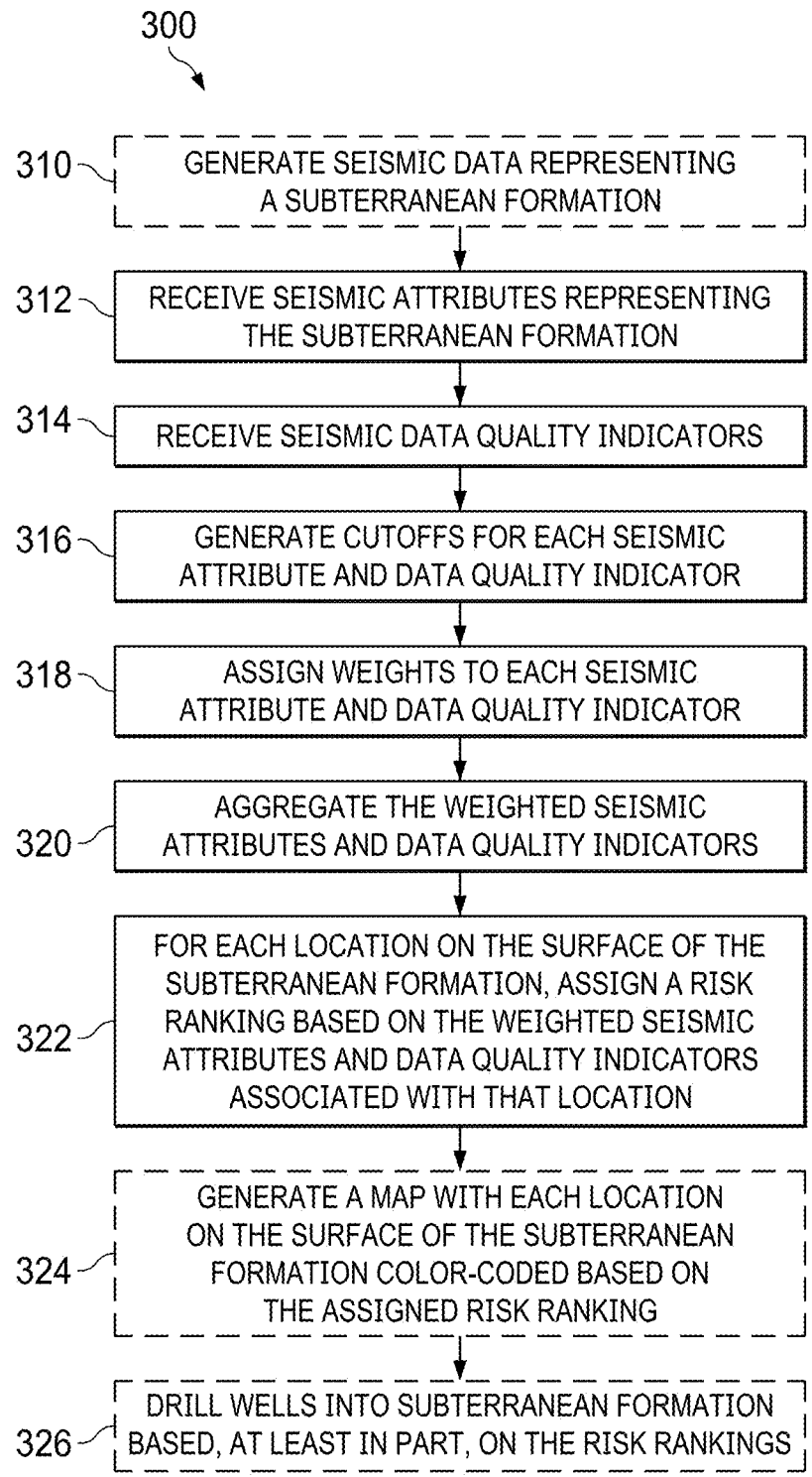
FIG. 4 is a flowchart of a method for placing wells in a hydrocarbon field based on seismic attributes and quality indicators.
Figure 5:
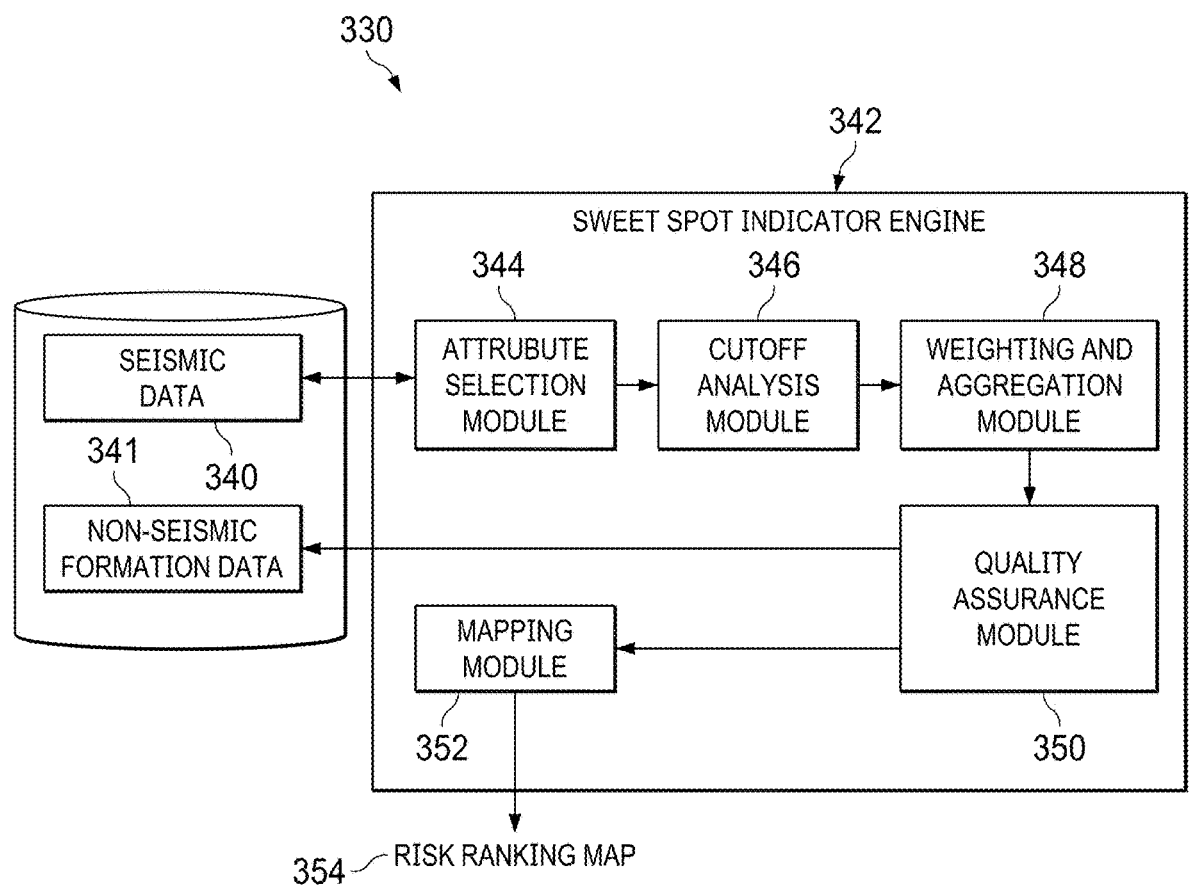
FIG. 5 is a block diagram of an example system implementing the method of FIG. 4.

FIG. 4 is a flowchart of a method 300 for placing wells in a hydrocarbon field based on seismic attributes and quality indicators. FIG. 5 is a block diagram of an example system 330 for implementing the method 300 of FIG. 4. The method 300 is described below with reference to the system 330. However, the method 300 can be implemented using other system configurations. For example, the method 300 can be implemented as a plug-in for commercial available systems such as DecisionSpace® and other data analysis and visualization systems.

The approaches discussed with reference to FIGS. 1-3 can be used to generate seismic data 340 representing a subterranean formation (optional step 310). In some implementations, the generation of seismic data is performed as part of the method 300. In other implementations, the method 300 uses previously generated seismic data 340.

The seismic data 340 can be stored in a database in communication with a sweet spot indicator engine 342. After specific seismic attributes are selected as input for the method 300, these seismic attributes representing the subterranean formation and the associated seismic data quality indicators are imported (step 312, step 314). In the system 300, an attribute selection module 344 is used to select specific seismic attributes from those available for a subterranean formation under investigation. The attribute selection module 344 then receives the selected seismic attributes and the associated seismic data quality indicators from the database. The selected attributes can be various numbers and types of seismic attributes and seismic data quality indicators generated through seismic data and/or well data.

Factors that impact whether a specific location is a "sweet spot" include indications of hydrocarbon presence and data regarding reservoir quality and geological characteristics of the subterranean formation at the location. It is desirable to include attributes associated with at least two of these general factors as input. In particular, the attributes and seismic quality indicators are chosen to represent different elements of reservoir characteristics or data quality.

Examples of indications of hydrocarbon presence include mono frequency spectral decomposition (Mono FSD) and reservoir to shadow mono frequency (RMSF). Examples of data regarding reservoir quality include sweetness and acoustic impedance. Examples of geological characteristics of the subterranean formation include permeability and/or other targeted properties in the subterranean formation.

Seismic data quality indicators provide an indication of the level of confidence that is appropriate for data at a specific location. Examples of seismic data quality indicators include seismic noise percentage and data confidence.

Cutoff parameters are then generated for each seismic attribute and data quality indicator (step 316). In the system 300, a cutoff analysis module 346 receives the imported seismic attributes and the associated seismic data quality indicators from the attribute selection module 344 and generates cutoff for each parameters being included in the analysis. These cut offs are predetermined through a feasibility analysis where relationships are established between an input and a certain property. The cut offs are hardwired for specific attributes and determined by the analyst.

A weighting and aggregation module 348 is used to assign weights to each seismic attribute and data quality indicator (step 318). The weighting and aggregation module 348 then aggregates the weighted seismic attributes and data quality indicators (step 320). The SSI algorithm for the test was designed to give more weight to the data quality (i.e. noise percentage and horizon confidence). The noise percentage map has a range of values between 0 and 100. The confidence map is a surface map, which does not have interpretation in areas that are difficult to map the surface. In other words, the interpretation was stopped in areas where it was difficult to map the surface. Once a certain geographic location passed a certain threshold in terms of data quality, then the other attributes had equal weight. Areas that had a noise percentage of 50 and higher with no interpretation available from the confidence map were marked as high risk with red color. However, the SSI algorithm is flexible to accommodate other suitable weights for the inputs, data quality indicator, and seismic attributes. These quantitative thresholds and weighting criteria can be manipulated and changed based on the subsurface properties, data qualities, and the interpreter judgment.

For each location on the surface of the subterranean formation, the weighting and aggregation module 348 assigns a risk ranking based on the weighted seismic attributes and data quality indicators associated with that location (step 322). Each level of risk is determined through a criterion, which is defined by the input cutoffs.

A quality assurance model 350 performs a quality assurance check on the data. Data which falls outside the cutoffs is removed from the analysis. After the quality assurance check has been performed, the risk rankings are added to the seismic data in the database and passed to a mapping module 352. The mapping module generates a map with each location on the surface of the subterranean formation color-coded based on the assigned risk ranking (step 324). The resulting map presents risked geobodies with each discrete color representing a different level of risk. The information presented in the map for a specific hydrocarbon field can be used in decide where to drill wells into the underlying subterranean formation. The wells are drilled into the subterranean formation based, at least in part, on the risk rankings represented by the map 354 (step 326). The wells can provide direct indications regarding the presence and quality of hydrocarbons at their locations. The wells can also provide additional data regarding the subterranean formation that is incorporated into the database as non-seismic formation data 341 and used in future iterations of the method 300 for that hydrocarbon field.

A prototype of the system 330 was developed to implement the method 300. The prototype was successfully tested using data from a project where the target was a deep heterogeneous reservoir saturated with gas.

Figure 6:
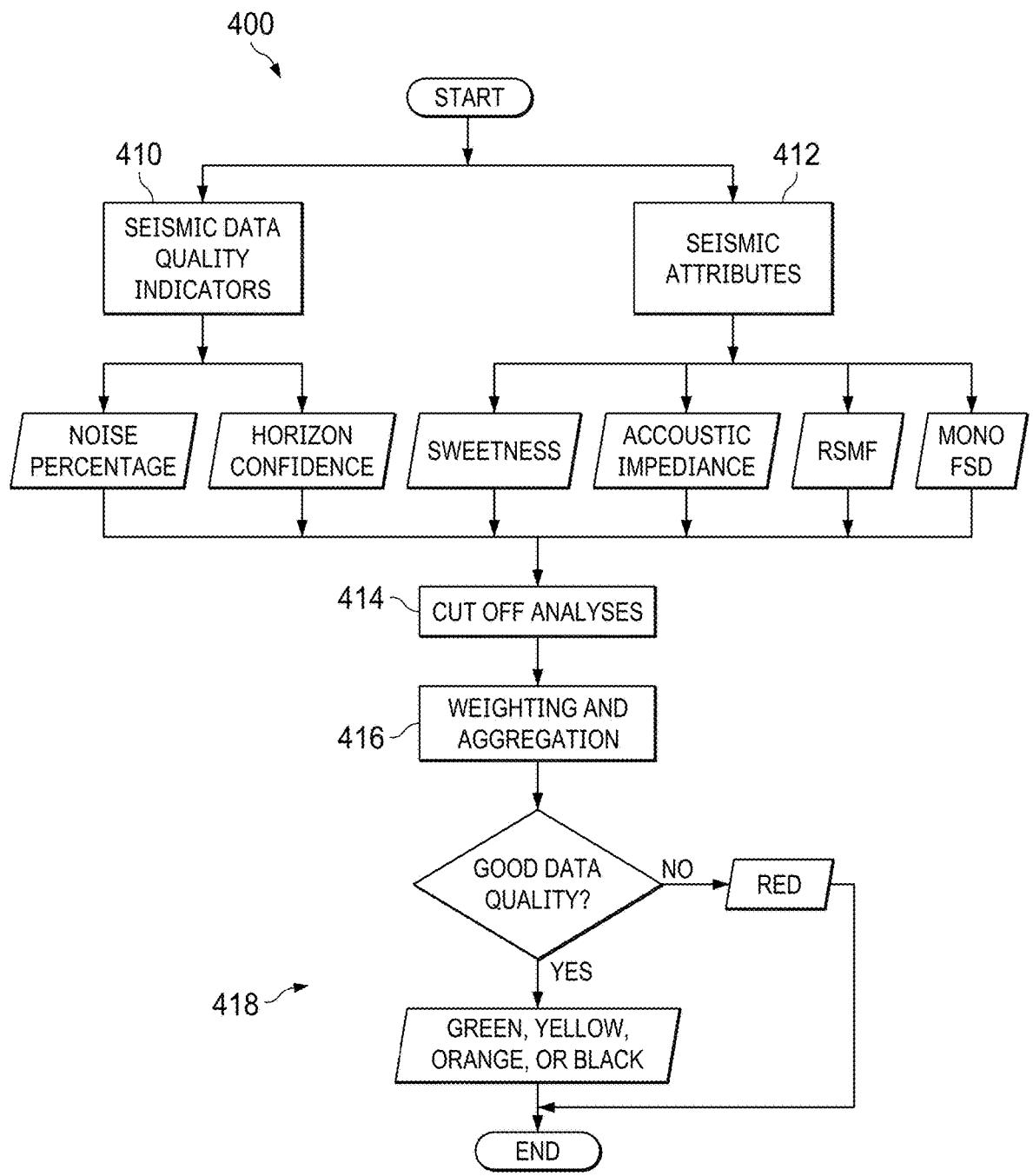
FIG. 6 illustrates operation of a prototype of the system of FIG. 5 during a test using real-world data.

FIG. 6 illustrates operation of the prototype during this test 400. The input attributes used in this test included mono frequency spectral decomposition (Mono FSD), reservoir to shadow mono frequency (RSMF), sweetness (Sweet), acoustic impedance (AI), seismic noise percentage (Noise %), and horizon interpretation confidence (Confidence). These attributes and seismic quality indicators were chosen to represent different elements of reservoir characteristics or data quality. The geographical distributions of these inputs can be presented as maps. The inputs included two seismic data quality indicators 410 and four seismic attributes 412. The seismic attributes 412 included two gas indicator attributes; Mono FSD and RSMF. Each of the two gas predictors is based on a different underlying concept and, thus, different approaches to assessing the likelihood gas was present at specific locations. Using two gas indicator attributes as input reduced the risk that an individual indicator over- or under-estimated the likelihood gas was present at mapped locations. Sweetness and acoustic impedance seismic attributes were included as predictors of reservoir quality (that is the quality of porosity at a given location). Seismic noise percentage and horizon confidence maps were included to reflect the seismic quality and how much data was trusted across the area of interest. Although the test used six maps generated through seismic attributes analysis and seismic data quality indicators as input, these systems and methods can be adapted to other numbers and types of seismic attributes and seismic data quality indicators generated through seismic data and/or well data.

Each of these attributes was validated individually through a feasibility analysis and cutoff analysis 414 was performed to identify cutoffs between categories. The cut offs were designed based on changes of a single seismic attribute values with respect to a change of a certain geological property. This resulted in four risk-ranking criteria that were each defined by cutoffs of six attributes.

In the test, the cutoff analysis led to an assignment of red color to areas with bad data quality while the rest of the areas were color-coded with either green, yellow, orange, or black in order of increasing risk (i.e., green indicated the lowest risk ranking and black indicated the highest risk ranking).

In weighting and aggregation 416, the data quality parameters (i.e., noise percentage and horizon confidence) had the highest weights assigned. The noise percentage map had a range of values between 0 and 100. The confidence map is a surface map, which does not have interpretation in areas that are difficult to map the surface (i.e., during generation of the surface map, the interpreter stopped the interpretation in area, where it is difficult to map the surface). Data quality was then assessed 418. Once a geographic location passed a certain threshold in terms of data quality, the other attributes were assigned equal weights. In the example, the threshold was 50. The threshold can be manipulated and change based on the subsurface properties, data qualities, and the interpreter judgment.

Locations with a noise percentage of 50 and higher with no interpretation available from the confidence map were are marked as high risk with red color. These systems and methods can be implemented with other weighting for the inputs, data quality indicator, and seismic attributes.

In the test, the prototype used four distinctive criteria to produce a colored map with five ranked risks. The criteria are based on the designed cutoffs. For example, green represents the sweetest zone with the lowest risk. The rest of the criteria define more lenient cut offs. The five rankings were green, yellow, orange, red, and black. The green color in the map, which represents the lowest risk, was defined to pass harsher cutoffs of all the inputs used. The cut offs were more lenient for subsequent ranking colors such that risk was increasing in yellow, orange, red, and black consequently.

Figure 7:
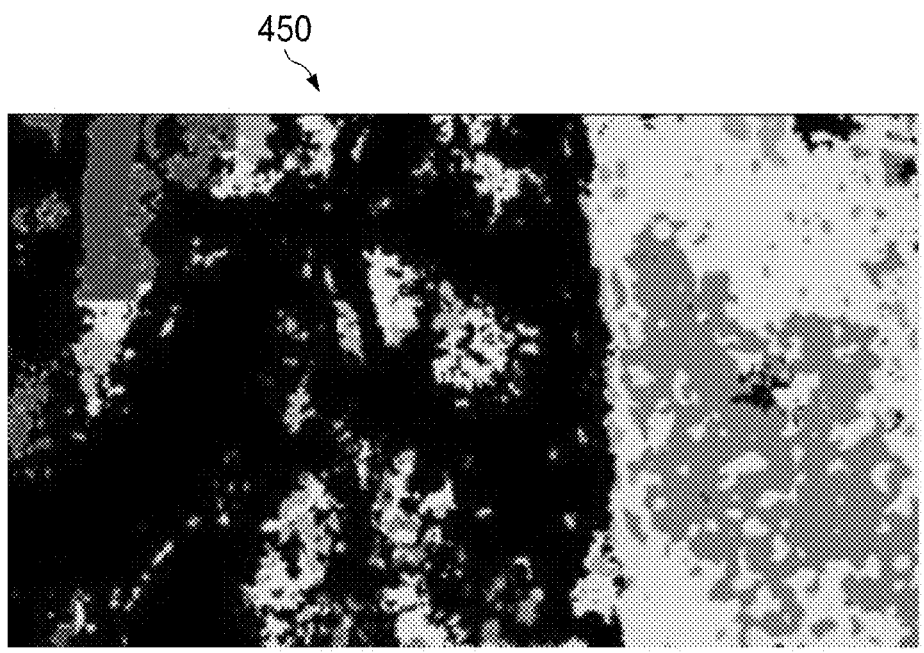
FIG. 7 is a color-coded risk-ranking map produced by the prototype system during this test.

FIG. 7 is the color-coded risk-ranking map produced by the prototype system during this test. The color-coded map that was generated by the prototype was used to propose ranked hydrocarbon wells. These wells included upside potential wells in addition to field development wells where understanding associated risks of each well provided more insights for management decision making. Although six inputs were used in the prototype for this test, this approach can be applied with other numbers and types of seismic attributes and/or data quality indicators.

Figure 8:
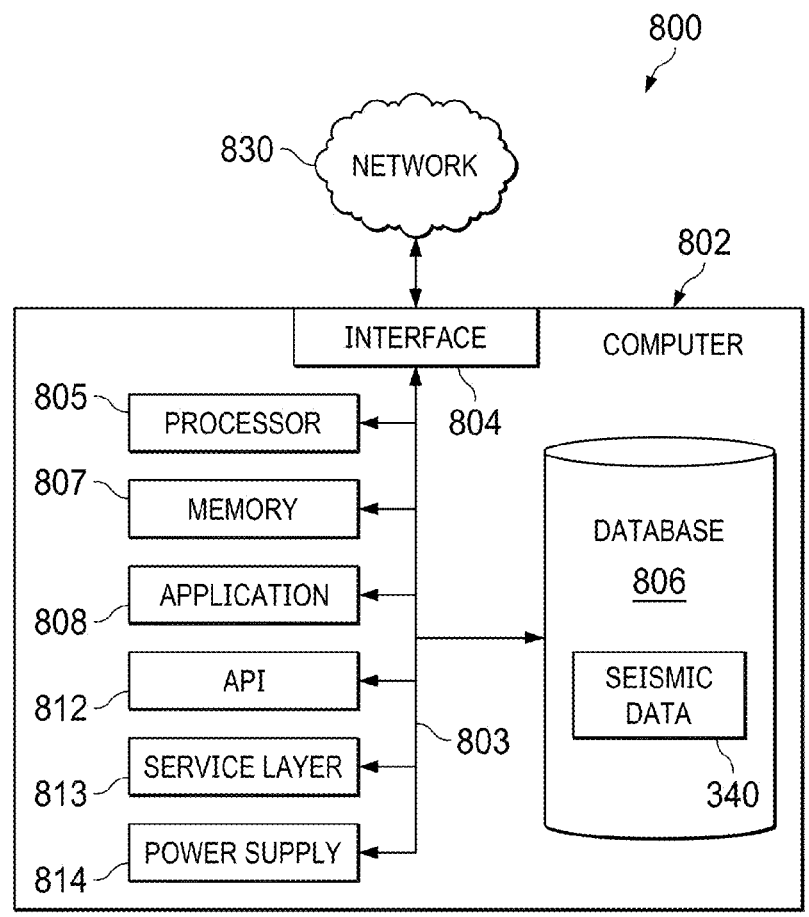
FIG. 8 is a block diagram illustrating an example computer system used to provide computational functionalities associated with described algorithms, methods, functions, processes, flows, and procedures as described in the present disclosure, according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the hardware of the interface can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data (for example, seismic data 816) for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method of placing wells in a hydrocarbon field based on seismic attributes and quality indicators associated with a subterranean formation of the hydrocarbon field, the method comprising:
    generating seismic data representing the subterranean formation;
    receiving seismic attributes representing the subterranean formation;
    receiving seismic data quality indicators;
    generating cutoffs for each seismic attribute and seismic data quality indicator;
    assigning a weight to each seismic attribute and seismic data quality indicator;
    aggregating the weighted seismic attributes and data quality indicators for each location in the hydrocarbon field;
    assigning a risk ranking based on the weighted seismic attributes and data quality indicators associated with each location in the hydrocarbon field based on the cutoffs;
    generating a map with each location on a surface of the subterranean formation being color-coded based on its assigned risk ranking; and
    drilling at least one location whose risk ranking is in a lowest category of risk rankings;
    wherein generating cutoffs comprises performing a feasibility analysis establishing a relationship between changes of values of a seismic attribute with respect to changes of a geological property of the subterranean formation; and
    wherein assigning the risk ranking based on the cutoffs comprises removing seismic data that falls outside the cutoffs.

2. The method of claim 1, wherein receiving seismic attributes comprises receiving at least one seismic attribute providing an indication of hydrocarbon presence and at least one seismic attribute providing an indication of reservoir quality.

3. The method of claim 2, wherein receiving seismic attributes comprises receiving at least two seismic attributes providing an indication of hydrocarbon presence that represent different elements of reservoir characteristics or data quality.

4. The method of claim 2, wherein receiving seismic attributes comprises receiving mono frequency spectral decomposition (Mono FSD) and reservoir to shadow mono frequency (RMSF) attributes.

5. The method of claim 4, wherein receiving seismic attributes comprises receiving sweetness and acoustic impedance attributes.

6. The method of claim 2, wherein receiving seismic data quality indicators comprises receiving seismic noise percentage, data confidence, or both.

7. A method of presenting a visual representation of sweet spots in in a hydrocarbon field based on seismic attributes and quality indicators associated with a subterranean formation of the hydrocarbon field, the method comprising:
   generating seismic data representing the subterranean formation;
   receiving seismic attributes representing the subterranean formation;
   receiving seismic data quality indicators;
   generating cutoffs for each seismic attribute and seismic data quality indicator by performing a feasibility analysis establishing a relationship between an input and a property of the subterranean formation;
   assigning a weight to each seismic attribute and seismic data quality indicator;
   aggregating the weighted seismic attributes and data quality indicators for each location in the hydrocarbon field;
   assigning a risk ranking based on the weighted seismic attributes and data quality indicators associated with each location in the hydrocarbon field based on the cutoffs;
   generating a map with each location on a surface of the subterranean formation being color-coded based on its assigned risk ranking and
   drilling at least one location whose risk ranking is in a lowest category of risk rankings;
   wherein generating cutoffs comprises performing a feasibility analysis establishing a relationship between changes of values of a seismic attribute with respect to changes of a geological property of the subterranean formation; and
   wherein assigning a risk ranking based on the cutoffs comprises removing seismic data that falls outside the cutoffs.

8. The method of claim 7, wherein receiving seismic attributes comprises receiving at least one seismic attribute providing an indication of hydrocarbon presence and at least one seismic attribute providing an indication of reservoir quality.

9. The method of claim 8, wherein receiving seismic attributes comprises receiving at least two seismic attributes providing an indication of hydrocarbon presence that represent different elements of reservoir characteristics or data quality.

10. The method of claim 9, wherein receiving seismic attributes comprises receiving mono frequency spectral decomposition (Mono FSD) and reservoir to shadow mono frequency (RMSF) attributes.

11. The method of claim 10, wherein receiving seismic attributes comprises receiving sweetness and acoustic impedance attributes.

* * * * *